B. Potter, Jr.
Steaming Bottling-Cork.
No. 16,098.  Patented Nov. 18, 1856.
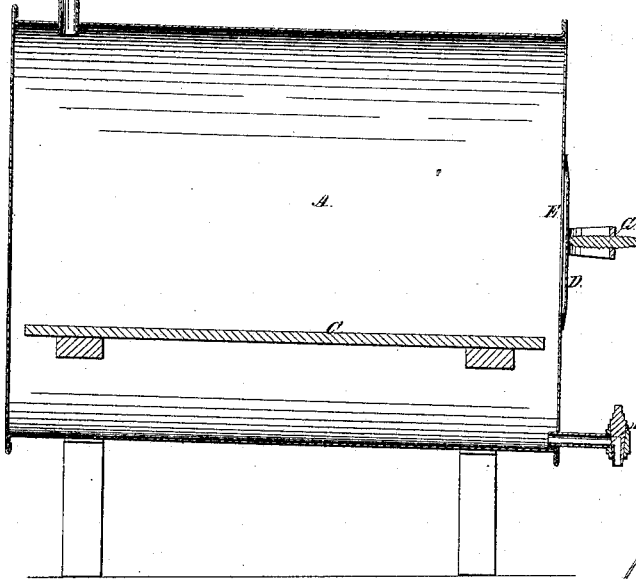
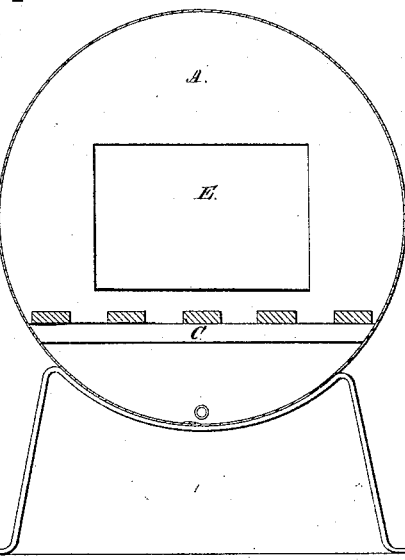
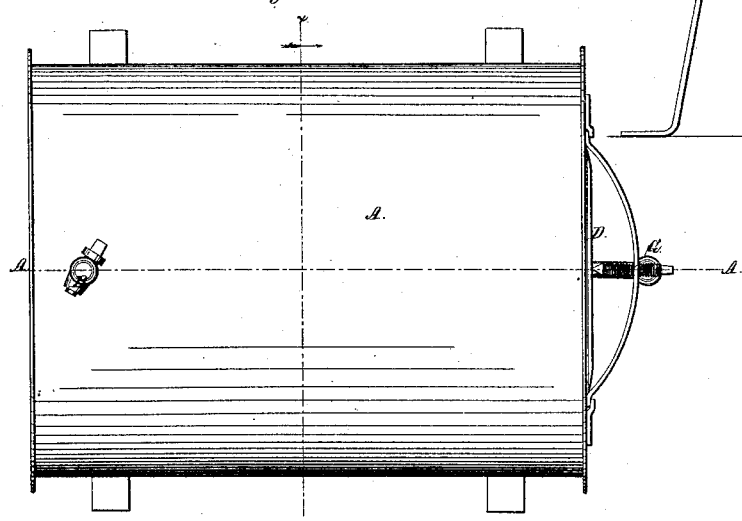

UNITED STATES PATENT OFFICE.

BENNETT POTTER, JR., OF CHARLESTOWN, MASSACHUSETTS.

MODE OF SOFTENING CORK BY STEAM.

Specification of Letters Patent No. 16,098, dated November 18, 1856.

*To all whom it may concern:*

Be it known that I, BENNETT POTTER, Jr., of Charlestown, in the county of Middlesex and State of Massachusetts, have invented a new and useful Method of Preparing Cork for Cutting, of which the following is a full, clear, and exact description, reference being had to the accompanying drawings, making part of this specification, in which—

Figure 1 is a plan; Fig. 2 a longitudinal section on the line A A; Fig. 3 a vertical section through the same on the line $x, x$.

The surface of cork is covered with a shell or skin of great hardness which requires to be removed or softened in some way before it can be cut. The means heretofore adopted to effect this end have been to char or burn the surface, but cork so prepared cannot be economically cut upon those machines that operate with circular knives, as there are hard spots through the body of the cork which immediately dull the knives.

The object of my invention is twofold firstly to soften the outside shell of the cork so that it may be cut without burning or charring—secondly to prepare the cork itself so that it may be cut by circular revolving knives.

My invention consists in subjecting the rough cork in sheets, and before it is worked to the action of steam for a suitable length of time to soften the shell and prepare the cork for cutting; I am then enabled to operate upon it by the circular knives, as will be hereafter more fully described.

To carry out my invention I provide a suitable vessel A (of the drawings) to which steam is admitted through the pipe B.

C is a grating of wood—D the door which closes an opening E, and is held up by a bail and screw G, or in any other suitable manner. The cock F is left partially open for the escape of the air and the condensed water.

The vessel should be built of a material and strength capable of sustaining the interior pressure to which it may be subjected.

The cork is laid upon the grating C and the door being closed steam is admitted to the vessel. When the air is expelled and steam begins to issue from the cock F this cock may be closed, and the cork be permitted to remain 5 to 20 minutes according to the temperature and pressure of the steam, if the pressure be high a less time will suffice, and in general the hotter the steam the quicker the cork will be prepared for cutting and its shell be softened. By this process the hard spots in the center of the cork which have heretofore remained unaffected by the charring are softened by the steam which penetrates through the whole body of the cork, and thus the material is better fitted for being operated upon by any species of knife. In addition to this improvement of the surface and the hard spots, it is found that the whole body of the cork is cut with much greater facility after being steamed. Although I deem it advisable to cut the cork soon after the operation of steaming, as it cuts easier then than after being dried for some time, yet it is not essential, as after the hard spots have once been softened by steaming, the cork never again obtains that hard grit which is so destructive to the knives.

What I claim as my invention and desire to secure by Letters Patent is—

Subjecting the cork to the action of steam, for the purpose set forth.

BENNETT POTTER, JR.

Witnesses:
SAM. COOPER,
THOS. R. ROACH.